Figure 1:
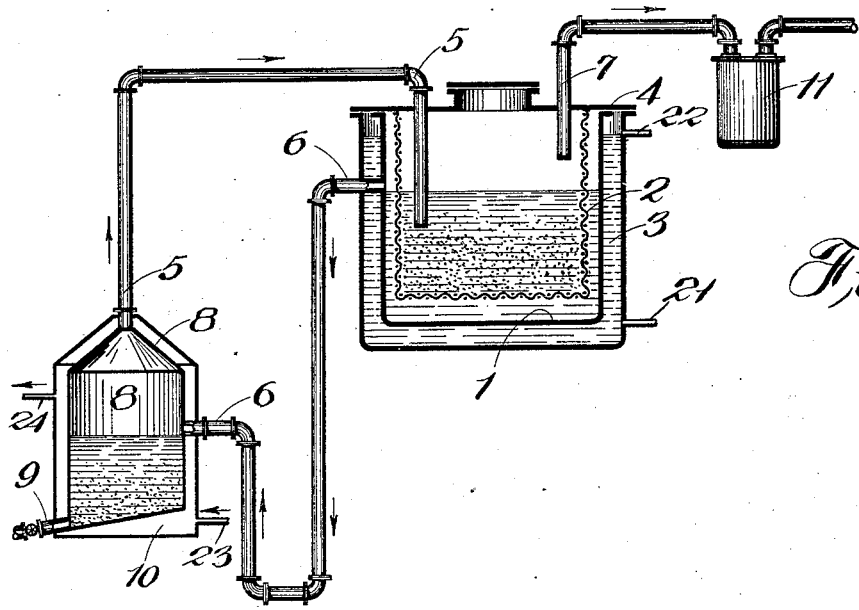

Dec. 22, 1931.  G. E. SEIL  1,837,493

SULPHUR SLUDGE TREATMENT

Filed May 7, 1926

INVENTOR
Gilbert E. Seil
BY
Munday Clarke & Carpenter
ATTORNEYS

Patented Dec. 22, 1931

1,837,493

UNITED STATES PATENT OFFICE

GILBERT E. SEIL, OF NEWARK, NEW JERSEY, ASSIGNOR TO THE KOPPERS COMPANY, OF PITTSBURGH, PENNSYLVANIA, A CORPORATION OF PENNSYLVANIA

SULPHUR SLUDGE TREATMENT

Application filed May 7, 1926. Serial No. 107,521.

The present invention relates in general to improvements in method and apparatus for treatment of sulphur-bearing sludge for the recovery of useful constituents thereof and more particularly to the recovery of sulphur and soluble compounds, such as ferrocyanides, from sulphur-bearing sludges, primarily such sludges as may be produced in processes for the removal of hydrogen sulphide and analogous impurities from fuel gases, for instance, those processes described and claimed in United States Patent 1,578,560 of Frederick W. Sperr, Jr., and in Patent of Frederick W. Sperr, Jr., and David L. Jacobson, 1,656,881, granted January 17, 1928, and applications of Frederick W. Sperr, Jr., Ser. Nos. 21,979 and 21,983, filed April 9, 1925. Briefly stated, such processes consist in subjecting the gas to contact with an alkaline liquid having an iron compound suspended therein, removing said liquid from contact with the gas, and subjecting it to aeration, thereby effecting a rejuvenation or revivification thereof, and liberating the sulphur, which is caused to float as a foam, and to be removed as such. The said foam is usually concentrated to a sludge, filtered, washed and dried. The product resultant from such simple procedure contains, in addition to sulphur, insoluble matter, such as iron oxide and/or sulphide, and soluble materials such as sodium ferro-ferrocyanide and/or ferrocyanide, each or all of which are somewhat difficult to remove by ordinary methods of washing and the like.

In my copending applications for United States Letters Patent, Serial Nos. 107,522 (SFSS) and 107,524 (SWSS), filed of even date, I have provided for treating sulphur-bearing sludges when the recovery of extraneous mineral matter was important, and when the recovery of an exceptionally pure sulphur was transcendent, respectively.

In my present invention, I provide means for recovering a substantially pure sulphur from the said sludge or other similar sulphur-bearing sludges, for recovering a substantially pure side product, such as a solution of ammonium ferrocyanide, and for the recovery of the insoluble material in a form suitable for further use, as for example iron sulphide. The invention has for further objects such other improvements and such other operative advantages or results as may be found to obtain in the processes or apparatus hereinafter described or claimed.

Briefly stated, the present invention consists in subjecting the sludge to be treated to the action of ammonium sulphide vapor, which condenses and dissolves the sulphur content of the said sludge, and reacts with more or less soluble compounds, as for example, sodium ferro-ferrocyanide, to form ammonium ferrocyanide, which is soluble in the condensed liquor of ammonium polysulphide; filtering the said liquor to remove insoluble compounds such as iron sulphide; and heating the filtrate to precipitate sulphur and revolatilize ammonium sulphide for the extraction of further quantities of sludge.

The products obtained from such treatment are, first, a residue of iron sulphide (or other insoluble sulphide) and second, a solution of ammonium ferrocyanide, containing sulphur in suspension, which may be filtered to recover the sulphur. The filtrate may then be concentrated to recover ammonium ferrocyanide.

Figure 2:
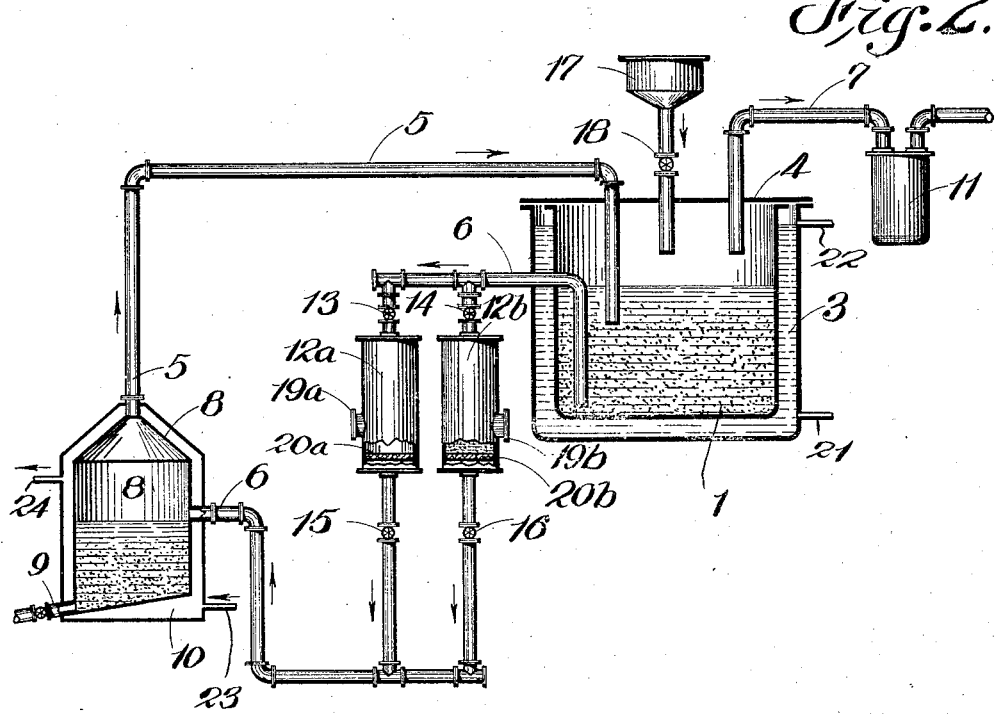

In the accompanying drawings forming a part of this specification and showing for purposes of exemplification a preferred apparatus and method in which the invention may be embodied and practiced but without limiting the claimed invention specifically to such illustrative instance or instances, Figure 1 is a diagrammatic elevational view partly in vertical cross-section of apparatus for treating sulphur-bearing sludge in accordance with the present invention; and Fig. 2 is a similar view of alternate apparatus, whereby the treatment may be conducted semi-continuously.

The same characters of reference designate the same parts in each of the views of the drawings.

Referring to the drawings, particularly Fig. 1, before charging the sulphur-bearing sludge into the apparatus, it is preferable to filter and wash it thoroughly. The resulting cake residue is discharged from the filter press, and is placed, preferably in a moist state, in the screen or basket 2, within the vessel 1, which vessel is provided with a water jacket 3 for cooling purposes, said jacket having an inlet 21 and outlet 22, a removable top 4, a vapor inlet 5 that dips into the liquid in vessel 1, and outlets 6 and 7. The vapor inlet conduit 5 communicates with the upper portion of the vaporizer 8, which is provided with a heating jacket 10, for superheated steam or the like admitted at 23 and withdrawn at 24, and vaporizer 8 is also provided with an inlet comprising the conduit 6 which leads the overflow from vessel 1 to such vaporizer, and such vaporizer is also provided with a drain 9. The process may be set in action by introducing ammoniacal liquor or ammonium sulphide or polysulphide solution into the vessel 8 and heating the same to boiling. The ammonia and/or ammonium sulphide is liberated as a vapor, and escapes with steam through the conduit 5 leading into the liquid in the cold vessel 1, wherein it reacts with the sulphur to form ammonium polysulphide, which dissolves in the condensed liquid. The condensed solution also reacts upon any sodium ferro-ferrocyanide and/or ferrocyanide, forming ammonium ferrocyanide, which dissolves. The solution overflows through the sealed conduit 6, and passes into the heated vessel 8, where the heat causes precipitation of free sulphur and volatilization of ammonium sulphide. The said vapor escapes with steam through conduit 5, dissolves more sulphur in the vessel 1, and thus a cyclic operation commences. During the course of the process, excess vapors from the vessel 1 are led by excess vapor outlet 7 through the sealed condenser 11, to be condensed. The condensate may be returned to the system. When desired, the liquid, containing precipitated sulphur and dissolved ammonium ferrocyanide, is withdrawn through the drain 9, filtered to recover the said sulphur, and concentrated to recover the ferrocyanide.

The porous screen 2 that serves to retain all the insoluble material, such as iron sulphide, present in the sludge, is removed as convenient from the vessel 1 and the retained material is removed therefrom.

In accordance with the present invention, I may so constitute my apparatus as to achieve a semi-continuous action, by providing, as shown more particularly in Fig. 2, alternate filters 12—a and 12—b in place of the screen 2 within the vessel 1. In this instance, by opening valves 13 and 15, and closing valves 14 and 16, the sludge and ammoniacal liquor are led by conduit 6 from vessel 1 to the filter 12—a in which the sludge and ammoniacal liquor are passed through the filter bed 20—a for removal of iron sulphide. When a considerable quantity of insoluble material, such as iron sulphide, has collected on the filtering surface 20—a, valves 13 and 15 are closed, valves 14 and 16 are opened, and the sludge is passed through the filter 12—b, while the sediment is removed from the filter 12—a, access to which is had through the opening 19a. The filters 12—a and 12—b are operated alternately as is convenient.

In such semi-continuous operation, I also provide the hopper 17 and valve 18 for introducing fresh quantities of sludge.

The use of apparatus such as shown in Fig. 2 makes possible a semi-continuous operation.

The invention as hereinabove set forth is embodied in particular form and manner but may be variously embodied within the scope of the claims hereinafter made.

I claim:

1. A process for obtaining substantially pure sulphur and substantially pure ammonium ferrocyanide and insoluble iron compound from material containing sulphur, ferrocyanide and iron compound which comprises: reacting on said material with an extracting solution of ammonium sulphide in an extractor to dissolve the sulphur and to dissolve soluble cyanides as ammonium ferrocyanide; withdrawing and filtering a portion of the extracting solution from the extractor to separate insoluble iron compounds therefrom; heating the withdrawn and filtered solution to volatilize ammonium sulphide and precipitate free sulphur therefrom; returning the vapors of ammonium sulphide to the extractor for further dissolving of sulphur; and condensing the vapors in the extracting solution in the extractor itself.

2. A process for obtaining pure sulphur and substantially pure soluble cyanide compounds and a substance which liberates free sulphur on oxidation from material containing sulphur, cyanide compounds and substances which liberate free sulphur on oxidation of the sulphide thereof which comprises: reacting on such material with an extracting solution in an extractor to dissolve sulphur and to dissolve soluble cyanide compounds; withdrawing and filtering a portion of the extracting solution from the extractor to separate therefrom as an insoluble so much as may be present of said substance which liberates free sulphur on oxidation of the sulphide thereof; heating the withdrawn and filtered extracting solution to volatilize the sulphur dissolving medium thereof and precipitate free sulphur therefrom; returning the vapors of the dissolving medium to the extractor for further dissolving of sulphur; and condensing said vapors in the extracting solution in the extractor itself.

3. A process for obtaining substantially pure sulphur and a substance which liberates free sulphur on oxidation of the sulphide thereof from material containing the same, which comprises: reacting on said material with a sulphur extracting solution in an extractor to dissolve sulphur; withdrawing and filtering a portion of the extracting solution from the extractor to separate as an insoluble from said portion so much of the said substance which liberates free sulphur on oxidation of the sulphide thereof; heating the withdrawn and filtered portion of the extracting solution to volatilize the dissolving medium and precipitate free sulphur; returning the vapors of the dissolving medium to the extractor for further dissolving of sulphur; and condensing said vapors in the extracting solution in the extractor itself.

4. A method for obtaining substantially pure sulphur from material containing sulphur, which comprises: extracting sulphur from said material with an extracting solution in an extractor to dissolve sulphur; withdrawing from the extractor a portion of the extracting solution containing extracted sulphur and filtering it; heating the withdrawn and filtered portion of the extracting solution to volatilize the sulphur dissolving medium and precipitate free sulphur; returning the vapors to the extractor for further dissolving of sulphur; and condensing said vapors in the extracting solution in the extractor itself.

5. A method for obtaining substantially pure sulphur from material containing sulphur, which comprises: extracting sulphur from said material with an extracting solution in an extractor to dissolve sulphur; withdrawing from the extractor a portion of the extracting solution containing extracted sulphur; heating the withdrawn portion of the extracting solution to volatilize the sulphur dissolving medium and precipitate free sulphur; returning the vapors to the extractor for further dissolving of sulphur; and condensing said vapors in the extracting solution in the extractor itself.

6. A method for obtaining substantially pure sulphur from material containing sulphur, which comprises: extracting sulphur from said material with an extracting solution of ammonium sulphide in an extractor to dissolve sulphur; withdrawing from the extractor a portion of the extracting solution containing extracted sulphur; heating the withdrawn portion of the extracting solution to volatilize ammonium sulphide and precipitate free sulphur; returning the vapors to the extractor for further extraction of sulphur; and condensing said vapors in the extracting solution in the extractor itself.

In testimony whereof I have hereunto set my hand.

GILBERT E. SEIL.